(12) United States Patent
Reynders, III

(10) Patent No.: US 11,551,165 B1
(45) Date of Patent: Jan. 10, 2023

(54) ACTION SELECTION BY REINFORCEMENT LEARNING AND NUMERICAL OPTIMIZATION

(71) Applicant: Latent Strategies LLC, Newton, MA (US)

(72) Inventor: John Van Wicheren Reynders, III, Newton, MA (US)

(73) Assignee: Latent Strategies LLC, Newton, MA (US)

( * ) Notice: Subject to any disclaimer, the term of this patent is extended or adjusted under 35 U.S.C. 154(b) by 0 days.

(21) Appl. No.: 17/713,725

(22) Filed: Apr. 5, 2022

(51) Int. Cl.
| | | |
|---|---|---|
| *G06Q 10/00* | (2012.01) | |
| *G06K 9/00* | (2022.01) | |
| *G06N 3/00* | (2006.01) | |
| *G06Q 10/04* | (2012.01) | |
| *G06K 9/62* | (2022.01) | |
| *G06N 3/08* | (2006.01) | |

(52) U.S. Cl.
CPC ......... *G06Q 10/047* (2013.01); *G06K 9/6262* (2013.01); *G06N 3/08* (2013.01)

(58) Field of Classification Search
CPC .......................................... G06Q 10/00–50/00
USPC .................................. 705/7.11–7.42; 706/15
See application file for complete search history.

(56) References Cited

U.S. PATENT DOCUMENTS

| | | | | |
|---|---|---|---|---|
| 11,288,612 | B2* | 3/2022 | Kislovskiy | G08G 1/202 |
| 11,335,137 | B2* | 5/2022 | Manchanda | G07C 5/0816 |
| 2020/0247611 | A1* | 8/2020 | Sharp | G05D 1/0297 |
| 2020/0364627 | A1* | 11/2020 | Qin | G06Q 10/047 |
| 2022/0101277 | A1* | 3/2022 | Banatao | G06T 7/0012 |
| 2022/0170751 | A1* | 6/2022 | Osanlou | G06Q 10/047 |

* cited by examiner

*Primary Examiner* — Mustafa Iqbal
(74) *Attorney, Agent, or Firm* — Fish & Richardson

(57) ABSTRACT

Methods, systems, and apparatus, including computer programs encoded on a computer storage medium, for selecting actions to be performed by an agent interacting with an environment. In one aspect, a method comprises, at each of one or more time steps: generating a respective action score for each action in a set of possible actions, wherein the set of possible actions comprises: (i) a plurality of atomistic actions, and (ii) one or more optimization actions, wherein each optimization action is associated with a respective objective function that measures performance of the agent on a corresponding auxiliary task; selecting an action from the set of possible actions in accordance with the action scores, wherein the selected action is an optimization action; in response to selecting the optimization action, performing a numerical optimization to identify a sequence of one or more atomistic actions that are predicted to optimize the objective function.

19 Claims, 5 Drawing Sheets

RESULT OF NUMERICAL OPTIMIZATION TO MINIMIZE
DISTANCE TRAVELED BY AGENT TO VISIT EACH
LOCATION IN A SET OF LOCATIONS

ACTION SELECTION BY REINFORCEMENT LEARNING AND NUMERICAL OPTIMIZATION

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes an action selection system implemented as computer programs on one or more computers in one or more locations.

The action selection system can train an action selection neural network, using reinforcement learning techniques, to select actions that enable an agent to perform a main task in an environment. The action selection neural network can select from a set of possible actions that includes: (i) a set of atomistic actions, and (ii) a set of optimization actions. Each atomistic action defines a respective action that can be performed by the agent to interact with the environment. Each optimization action is associated with a respective objective function that measures performance of the agent on a corresponding auxiliary task. An auxiliary task can refer to a task that is related to the main task, e.g., such that performing the auxiliary task can advance the agent toward the objective of accomplishing the main task.

When the action selection neural network selects an optimization action at a time step, the action selection system can perform a numerical optimization to identify a sequence of atomistic actions that are predicted to optimize the objective function associated with the optimization action. The action selection system can then select the sequence of atomistic actions as actions to be performed by the agent at a sequence of time steps starting from the current time step. Performing the sequence of atomistic actions can enable the agent to effectively accomplish the auxiliary task corresponding to the optimization action.

According to a first aspect, there is provided a method performed by one or more computers for selecting actions to be performed by an agent interacting with an environment to cause the agent to accomplish a main task, the method comprising: selecting an action to be performed by an agent at each time step in a sequence of time steps, comprising, at each of one or more time steps: obtaining a current observation characterizing a current state of the environment; processing the current observation using an action selection neural network to generate an action selection output that comprises a respective action score for each action in a set of possible actions, wherein the set of possible actions comprises: (i) a plurality of atomistic actions, wherein each atomistic action defines a respective action that can be performed by the agent to interact with the environment, and (ii) one or more optimization actions, wherein each optimization action is associated with a respective objective function that measures performance of the agent on a corresponding auxiliary task; selecting an action from the set of possible actions in accordance with the action scores, wherein the selected action is an optimization action; in response to selecting the optimization action: performing a numerical optimization to identify a sequence of one or more atomistic actions that are predicted to optimize the objective function that measures performance of the agent on the corresponding auxiliary task; and selecting the sequence of atomistic actions as actions to be performed by the agent at a sequence of one or more time steps starting from the current time step.

In some implementations, the method further comprises: receiving, at each time step in the sequence of time steps, a reward that characterizes performance of the agent on the main task; and training the action selection neural network based on the rewards using reinforcement learning techniques.

In some implementations, performing the numerical optimization comprises: performing the numerical optimization over a space of latent variables to identify an optimal latent variable that is predicted to optimize the objective function, wherein each latent variable in the space of latent variables defines a plan for the agent to perform the auxiliary task; and mapping the optimal latent variable onto a sequence of one or more atomistic actions that, if performed by the agent, would cause the agent to execute the plan defined by the optimal latent variable.

In some implementations, the auxiliary task comprises navigating to each location in a set of locations in the environment, and each latent variable in the space of latent variables defines a respective order in which the agent should navigate to locations in the set of locations.

In some implementations, the objective function measures a distance traveled by the agent to navigate to each location in the set of locations.

In some implementations, performing the numerical optimization over the space of latent variables comprises: performing the numerical optimization over the space of latent variables using a dynamic programming optimization technique.

In some implementations, the auxiliary task comprises optimizing a target feature of the environment.

In some implementations, the objective function is defined by a feature model that is configured to process an input sequence of atomistic actions to generate an output that defines a value of the target feature that is predicted to result from the agent performing the input sequence of atomistic actions.

In some implementations, performing the numerical optimization comprises: performing the numerical optimization over a set of possible sequences of atomistic actions to identify an optimal sequence of atomistic actions that is predicted to optimize the feature model.

In some implementations, performing the numerical optimization over the set of possible sequences of atomistic actions comprises: initializing a current sequence of atomistic actions; and iteratively updating the current sequence of atomistic actions, comprising, at each optimization iteration in a sequence of optimization iterations: processing the current sequence of atomistic actions using the feature model to generate a target feature value; determining gradients of the target feature value with respect to the current sequence of atomistic actions; and updating the current sequence of atomistic actions using the gradients.

In some implementations, the environment comprises an industrial facility, the target feature of the environment defines an output of a chemical process in the industrial facility, and the feature model comprises a chemical process simulation model.

In some implementations, the feature model comprises a neural network model.

In some implementations, the auxiliary task comprises maintaining a state of the environment within a set of allowable states.

In some implementations, the set of allowable states comprise states where the agent is within a threshold distance of a desired trajectory through the environment.

In some implementations, the objective function measures deviation of a state of the environment from the set of allowable states, and wherein performing the numerical optimization comprises: obtaining a dynamics model that models dynamics of the environment; and performing the numerical optimization to identify a sequence of atomistic actions that are predicted to optimize the objective function, using optimal control optimization techniques, subject to a constraint that the sequence of atomistic actions satisfies the dynamics model that models the dynamics of the environment.

In some implementations, at each of one or more time steps in the sequence of time steps, selecting the action to be performed by the agent at the time step comprises: selecting an atomistic action from the set of possible actions; and in response to selecting the atomistic action, causing the agent to perform the atomistic action at the time step.

In some implementations, the environment is a simulated environment.

In some implementations, the agent is a mechanical agent.

According to another aspect, there is provided a system comprising: one or more computers; and one or more storage devices communicatively coupled to the one or more computers, wherein the one or more storage devices store instructions that, when executed by the one or more computers, cause the one or more computers to perform operations of the methods described herein.

According to another aspect, there are provided one or more non-transitory computer storage media storing instructions that when executed by one or more computers cause the one or more computers to perform operations of the methods described herein.

Particular embodiments of the subject matter described in this specification can be implemented so as to realize one or more of the following advantages.

As part of accomplishing a main task, an agent can be required to accomplish one or more auxiliary tasks, e.g., that form part of the solution to the main task. The action selection system enables the action selection neural network to select an optimization action corresponding to an auxiliary task, and in response to the selection of the optimization action, performs a numerical optimization to determine a sequence of atomistic actions that would enable the agent to solve the auxiliary task. The action selection system thus does not require the action selection neural network to learn to implicitly encode solutions to the auxiliary tasks in the parameter values of the action selection neural network. Rather, the action selection neural network can call upon an optimization engine to determine an effective solution to an auxiliary task through direct numerical optimization of an objective function that measures performance of the agent on the auxiliary task. The action selection system can thus accelerate the training of the action selection neural network and reduce consumption of computational resources during training, e.g., by enabling the action selection neural network to achieve an acceptable level of performance over fewer training iterations and using less training data.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
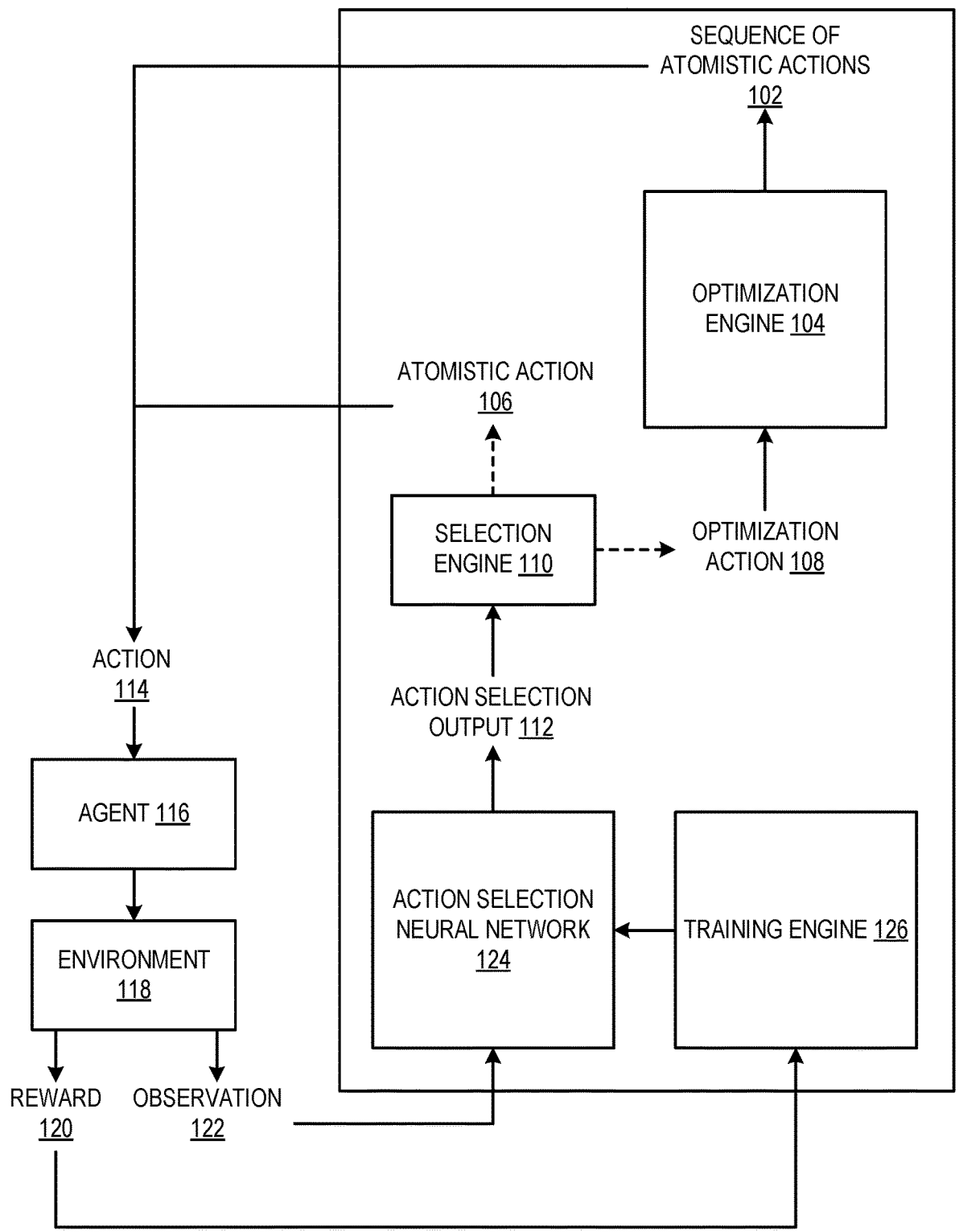
FIG. 1 shows an example action selection system.

FIG. 1 shows an example action selection system 100. The action selection system 100 is an example of a system implemented as computer programs on one or more computers in one or more locations in which the systems, components, and techniques described below are implemented.

The action selection system 100 is configured to control an agent 116 interacting with an environment 118 to accomplish one or more tasks in the environment 118. More specifically, the action selection system 100 selects a respective action 114 to be performed by the agent 116 at each time step in a sequence of time steps over which the agent 116 interacts with the environment 118.

The action selection system 100 can receive, at each time step: (i) a respective observation 122 for the time step, and (ii) a respective reward 120 for the time step.

An observation 122 for a time step can refer to any appropriate data characterizing the state of the environment at the time step, and can be represented as an ordered collection of numerical values, e.g., by one or more vectors, matrices, or other tensors of numerical values. Examples of observations will be described in more detail below.

A reward 120 for a time step can represent, e.g., whether the agent 116 has accomplished a task at the time step, or a progress of the agent towards accomplishing a task as of the time step. Generally, a reward 120 for a time step can be represented, e.g., by a numerical value, and can be generated by a reward function based on, e.g., the state of the environment at the time step, the action performed by the agent at the time step, or both. Examples of rewards will be described in more detail below.

The action selection system 100 is broadly applicable, e.g., to control any appropriate agent 116 performing any appropriate actions 114 to interact with any appropriate environment 118. A few examples of agents, actions, and environments are described next, but it will be appreciated that these examples are non-limiting and are provided for illustrative purposes only. Moreover, each of the environments described herein can be a real-world environment, i.e., that exists in the real-world, or a simulated environment, i.e., that is implemented by a system of one or more computers. Similarly, the agents described herein can be real-world agents performing real-world actions or simulated agents performing simulated actions.

In some implementations, the environment 118 can be a physical environment, and the agent can represent an entity acting in the physical environment, e.g., the agent can represent a robot, a mechanical arm, or an autonomous or semi-autonomous land, sea, or air vehicle.

The possible actions that can be performed by the agent in the physical environment can include, e.g., applying torques to the joints of a robot or a mechanical arm, or providing steering or acceleration control signals to an autonomous or semi-autonomous land, sea, or air vehicle.

Observations of the environment can be generated, e.g., by one or more sensors of the agent, e.g., a camera sensor, a radar sensor, a lidar sensor, an audio sensor, a heat sensor, an accelerometer sensor, a wind speed sensor, etc.

If the agent represents a robot or a mechanical arm, then the agent can perform tasks including, e.g., grasping and moving physical objects in the environment. If the agent represents an autonomous land, sea, or air vehicle, then the agent can perform tasks including, e.g., navigation tasks, e.g., navigating to specified destinations in the environment; exploration tasks, e.g., navigating through previously unseen portions of the environment; or delivery tasks, e.g., delivering objects to various locations in the environment.

The reward received at each time step can be, e.g.: a binary reward having value 1 at each time step when a task is accomplished, e.g., an object is delivered, and 0 otherwise; or a reward drawn from a continuous range, e.g., [0,1], representing a progress of the agent toward accomplishing a task, e.g., a fraction of the environment explored by the agent.

In some implementations, the environment 118 can be an industrial facility, e.g., a data center, a manufacturing facility, or an industrial process plant, e.g., an oil refinery, a paper mill, or a smelting plant. In these implementations, the agent can be a control system of the industrial facility, e.g., that controls at least some of the operations of the industrial facility.

The possible actions that can be performed by the agent controlling the industrial facility can include, e.g., actions to control the rotational speed and direction of fans in a data center, actions to control the movement of robotic arms in a manufacturing facility, or actions to control flow of fluids through pipes or the operation of machines in an industrial process plant.

Observations of the industrial facility can be generated by sensors located in the industrial facility, e.g., heat sensors, pressure sensors, fluid flow sensors, etc.

The agent controlling the industrial facility can perform tasks including, e.g., maintaining temperature within a predefined range (e.g., in a data center), assembling products (e.g., in a manufacturing facility), or generating processed outputs (e.g., in an industrial process plant).

The reward received at each time step can be, e.g., a reward defining a rate of output of the industrial facility, e.g., a number of products being produced per hour in a manufacturing facility, or a volume of processed material being generated per hour in an industrial process plant.

In some implementations, the environment can be a resource allocation environment, where the agent represents an entity (e.g., organization, e.g., business) operating within the resource allocation environment.

Each possible action that can be performed by the agent in the resource allocation environment can represent a resource allocation action, e.g., that defines a respective change to an amount of resources (e.g., funding or personnel) that the entity provides to a respective unit (e.g., department or project within an organization represented by the agent). Other examples of possible actions can include, e.g., modifying supply chains, reconfiguring manufacturing plants, modifying shipping or logistical operations, modifying product pricing (e.g., to implement multi-market price discrimination), modifying product features, or modifying timelines for introducing products into markets.

Observations of the resource allocation environment can characterize, e.g., resources being received by the agent (e.g., revenue to an entity represented by the agent), resources being expended by the agent (e.g., expenses of an entity represented by the agent), efficiency of the agent (e.g., productivity of personnel working for an entity represented by the agent), etc.

The reward received at each time step can be based on one or more of: an operating margin of the organization at the time step, a profit of the organization at the time step, whether the organization has achieved an objective as of the time step (e.g., delivering a product to market), etc.

In some implementations, the environment can be a natural resource environment, e.g., a forestry, farming, fishing, or mining environment, where the agent represents an entity (e.g., an organization) controlling or managing the natural resource environment.

Possible actions that can be performed by the agent in the natural resource environment include, e.g., scheduling planting and harvesting timelines for specified crops in a farming environment, or setting maximum allowable catch-rates in a fishing environment.

Observations of the natural resource environment can characterize, e.g., current levels of various resources in the environment (e.g., current yields of various crops in a farming environment), rates of change in the levels of various resources in the environment (e.g., rates of change in fish populations in a fishing environment), levels of pollutants or ecological damage in the environment, or a combination thereof.

The reward received at each time step can be based on yields of natural resources (e.g., crop yields in a farming environment, e.g., measured in tons) extracted from the natural resource environment at the time step.

The action selection system 100 includes an action selection neural network 124, a selection engine 110, an optimization engine 104, and a training engine 126, which are each described in more detail next.

The action selection neural network 124 is configured to process an input comprising an observation 122 characterizing the state of the environment 118 at a time step to generate an action selection output 112. The action selection output 112 includes a respective score for each action in a set of possible actions.

The set of possible actions includes: (i) a set of "atomistic" actions, and (ii) a set of "optimization" actions.

Each atomistic action defines a respective action that can be performed by the agent to interact with the environment. For example, atomistic actions for an agent navigating through a physical environment can include steering and acceleration actions. Other examples of atomistic actions are described in more detail above.

Each optimization action corresponds to a respective "auxiliary" task that can be performed by the agent in the environment 118, and is associated with a respective objective function that measures a performance of the agent on the corresponding auxiliary task.

Generally, an auxiliary task refers to a task other than a "main" task being performed by the agent in the environment. The main task being performed by the agent can refer to the task for which the action selection system 100 receives rewards 120, i.e., such that the reward 120 at each time step characterizes the performance of the agent on the main task. Auxiliary tasks can be tasks that are related to the main task, e.g., such that performing an auxiliary task advances the agent toward the objective of performing the main task. A few examples of auxiliary tasks are described next.

In some implementations, the agent can be an entity (e.g., a robot, vehicle, or aircraft) performing a main task of navigating through a physical environment to perform a respective operation at each location in a set of locations in the environment. The respective operation to be performed by the agent at each location can include, e.g., depositing an object at the location or obtaining an object at the location, where the object can be, e.g., a package or a passenger. An auxiliary task can include navigating to each location in a set of one or more locations in the environment. That is, in this example, the auxiliary task represents a constituent part of the main task, e.g., such that the agent must complete the auxiliary task in order to perform the main task. Performing the auxiliary task can advance the agent toward the objective of performing the main task, e.g., by causing the agent to navigate to the locations where the agent performs the operations required to complete the main task. The objective function associated with the optimization action can measure, e.g., a time required for the agent to complete the auxiliary task, or a distance traveled by the agent to complete the auxiliary task.

In some implementations, an auxiliary task can include maintaining the state of the environment within a set of a states designated as "allowable" states. A state can be designated as being an allowable state if it satisfies one or more criteria, e.g., safety criteria, e.g., such that being in the state is unlikely to result in damage, e.g., to the agent or to other aspects of the environment. Performing the auxiliary task can advance the agent toward the objective of performing the main task, e.g., by causing the agent to operate safely while completing the main task.

For example, for an agent performing a main task of navigating through an environment to a target location, the set of allowable states may include states where the agent is within a threshold distance of a desired trajectory through the environment. Thus, in this example, performing the auxiliary task involves maintaining a position of the agent within the threshold distance of the desired trajectory of the agent. In a particular example, the agent may be an aircraft navigating through turbulent conditions, and performing the auxiliary task may result in stabilization of the aircraft. In another particular example, the agent may be a vehicle traveling in hazardous weather conditions, and performing the auxiliary task may result in regaining control of the vehicle during hydroplaning.

As another example, for an agent performing a main task of optimizing output of an industrial facility, the set of allowable states may include states where the operating states of one or more components (e.g., machines) of the industrial facility are within allowable ranges. The operating state of a component of an industrial facility can characterize, e.g., the temperature of the component, the pressure of the component, or any other appropriate aspect of the component. Thus, in this example, performing the auxiliary task involves maintaining the operating states of one or more components of the industrial facility within allowable ranges.

In these examples, the objective function associated with the optimization action can measure, e.g., a deviation of the state of the environment from the set of allowable states. For example, for an auxiliary task of maintaining a position of the agent within a threshold distance of a desired trajectory, the objective function can measure a central tendency (e.g., average) of a distance (e.g., $L_2$ distance) between: (i) the agent, and (ii) the desired trajectory of the agent. As another example, for an auxiliary task of maintaining the operating states of one or more components of an industrial facility within allowable ranges, the objective function can measure a duration of time during which the operating states of the components are outside the allowable ranges.

In some implementations, an auxiliary task can include optimizing (e.g., maximizing or minimizing) a "target" feature of the environment, optionally, subject to constraints on one or more "constrained" features of the environment. For example, for an agent performing a main task of optimizing the output of an industrial facility, an auxiliary task can involve maximizing the output of a particular process within the facility, subject to constraints on the operating states (e.g. temperatures, pressures, etc.) of one or more machines involved in the process. As another example, for an agent performing a main task of temperature control within a data center, an auxiliary task can involve maximizing airflow through a particular ventilation shaft. As another example, for an agent operating within a resource allocation environment, an auxiliary task can include maximizing sales volume of a particular product subject to a constraint on average profit margin achieved per product sale. In these examples, the objective function can measure the value of the target feature of the environment.

In some implementations, an auxiliary task can include selecting one or more entities from a set of entities, where each entity is associated with a respective "weight" and "value." The objective function can measure a total value of the selected entities, and the auxiliary task can be subject to a constraint that a total weight of the selected entities be less than a maximum allowable weight.

For example, for an agent performing a main task of navigating through an environment to collect objects (e.g., packages), each entity may be an object, the weight of each object may define a mass of the object, and the value of each object may define a utility of the object. In this example, performing the auxiliary task can involve selecting the objects to be collected by the agent in the environment to maximize the total utility of the collected objects while requiring the total weight of the selected objects to be less than a maximum allowable weight.

In another example, in a resource allocation environment, each entity may be a project, the weight of each project may define an amount of resources required to complete the project, and the value of each project may define a result achieved by completion of the project. In this example, performing the auxiliary task can involve selecting projects to be completed to maximize the total result achieved by completing the selected projects while requiring that the total amount of resources to complete the selected projects be less than a maximum amount of resources.

In some implementations, an auxiliary task can include determining an assignment of each entity from a set of entities to a respective container in a set of containers, where each entity is associated with a "weight" and each container is associated with a respective "capacity." The objective function can measure a number of containers that are assigned at least one entity, and the auxiliary task can be subject to a constraint that, for each container, a cumulative weight of the entities assigned to the container by less than the capacity of the container. For example, for an agent performing a main task of operating equipment in a warehouse, each entity can be an object, the weight of each object can define a mass of the object, each container can represent a delivery vehicle, and the capacity of each delivery vehicle can represent a weight capacity of the cargo bed of the delivery vehicle. In this example, performing the auxiliary task can involve assigning objects to delivery vehicles to minimize the number of delivery vehicles used to transport the objects while requiring that the total mass of objects assigned to each delivery vehicle be less than the weight capacity of the cargo bed of the delivery vehicle.

The selection engine 110 is configured to process an action selection output 112 generated by the action selection neural network 124 to select an action from the set of possible actions. A few example techniques by which the selection engine 110 can select an action from the set of possible actions based on the action selection output 112 are described next.

In one example, the selection engine 110 can select an action that is assigned a highest score, from among the set of possible actions, by the action selection output 112.

In another example, the selection engine 110 can process the action scores defined by the action selection output (e.g., using a soft-max function) to generate a probability distribution over the set of possible actions. The selection engine 110 can then sample an action from the set of possible actions in accordance with the probability distribution over the set of possible actions.

In another example, the selection engine 110 can select an action using an exploration policy, e.g., an ∈-greedy exploration policy, where ∈ ∈ (0,1). More specifically, with probability ∈, the selection engine 110 can randomly sample an action from the set of possible actions, and with probability 1—∈, the selection engine 110 can select an action using the action selection output, e.g., using either of the techniques described above. (Randomly sampling an action from the set of possible actions can refer to, e.g., sampling an action in accordance with a uniform distribution over the set of possible actions, i.e., such that each action is equally likely to be selected).

At each time step where the selection engine 110 selects an action from the set of possible actions, the selected action can be: (i) an atomistic action 106, or (ii) an optimization action 108.

If the selection engine 110 selects an atomistic action 106 at a time step, then the action selection system 100 can cause the agent 116 to perform the atomistic action 106 at the time step. For example, the action selection system 100 can transmit instructions to the agent 116 to perform the atomistic action 106, e.g., by way of data communication network.

If the selection engine 110 selects an optimization action 108 at a time step, then the action selection system 100 can provide data identifying the optimization action 108 as an input to the optimization engine 104, which is described in more detail next.

The optimization engine 104 is configured to receive data identifying an optimization action 108, and to perform a numerical optimization to identify a sequence of one or more atomistic actions that are predicted to optimize the objective function associated with the optimization action 108. That is, the optimization engine 104 performs a numerical optimization to identify a sequence of atomistic actions 102 that, if performed by the agent 116, are predicted to optimize the objective function measuring performance of the agent on the auxiliary task corresponding to the optimization action 108.

More specifically, each sequence of atomistic actions that could be performed by the agent achieves a respective performance on the auxiliary task corresponding to the optimization action, i.e., as measured by the objective function associated with the optimization action. The optimization engine 104 identifies a particular sequence of atomistic actions, i.e., from a set of possible sequences of atomistic actions, that is predicted to (approximately or exactly) optimize the objective function measuring performance of the agent on the auxiliary task corresponding to the optimization action 108. Thus performing the sequence of atomistic actions 102 identified by the optimization engine 104 can cause the agent 116 to effectively perform the auxiliary task corresponding to the optimization action 108.

The optimization engine 104 can perform any appropriate numerical optimization to identify a sequence of atomistic actions 114 that is predicted to (approximately or exactly) optimize the objective function associated with the optimization action 108. Generally, the numerical optimization is performed in accordance with a predefined (e.g., hard-coded) optimization algorithm, i.e., such that the optimization algorithm itself is not learned during training of the training of the action selection neural network 124. A few examples of possible numerical optimizations that can be performed by the optimization engine 104 are described next.

In some implementations, the optimization engine 104 performs a numerical optimization over a space of latent variables (i.e., a "latent space"), where each latent variable in the latent space can be mapped onto a corresponding sequence of atomistic actions that can be performed by the agent. That is, in these implementations, the optimization engine 104 selects a latent variable (i.e., from the set of latent variables) that is associated with a sequence of atomistic actions that is predicted to optimize the objection function measuring performance of the agent on the auxiliary task. Each latent variable can be understood as defining a "plan" for the agent to perform the auxiliary task, and each latent variable can be mapped onto a sequence of atomistic actions that would execute the plan defined by the latent variable. As will be described and illustrated below, performing the numerical optimization over the latent space (e.g., rather than directly over the set of possible sequences of atomistic actions) can reduce the complexity of the numerical optimization.

In one example, as described above, the agent can be an entity (e.g., a robot, vehicle, or aircraft) navigating through a physical environment, and the auxiliary task can include navigating to each location in a set of locations in the environment. In this example, each latent variable in the latent space can define an order in which the agent should visit each location in the set of locations. For example, if set of locations includes N locations indexed by $\{1, \ldots, N\}$, then each latent variable in the latent space can be represented by a respective permutation of the index set $\{1, \ldots, N\}$, i.e., where the ordering of the indices in a permutation defines the order in which the agent should visit the spatial locations.

The optimization engine 104 can optimize an objective function that measures a total distance traveled by the agent in visiting each location in the set of locations by performing a numerical optimization over the latent space. The optimization engine 104 can optimize the objective function over the latent space using any appropriate numerical optimization technique, e.g., a dynamic programming technique (e.g., the Held-Karp algorithm) or a multi-fragment (MF) algorithm. More generally, it will be appreciated that optimizing the objective function over the latent space in this instance equivalent to solving a "traveling salesman problem," and the optimization engine 104 can implement any optimization technique applicable to solving the traveling salesman problem.

After performing the numerical optimization over the latent space to determine a latent variable that identifies an order in which the agent should visit the locations in the set of locations, the optimization engine 104 can map the latent variable to a corresponding sequence of atomistic actions. For example, if the agent navigates by performing steering and acceleration actions, then the optimization engine 104 can map the latent variable to a sequence of atomistic actions defining steering and acceleration actions that would cause the agent to visit the locations in the order defined by the latent variable.

Performing the numerical optimization over the latent space, i.e., rather than over the set of possible sequences of atomistic actions, can reduce the complexity of the optimization. In particular, the dimensionality of the latent space may be significantly less than the dimensionality of the set of possible sequences of atomistic actions. For instance, the number of steering and acceleration actions required to cause the agent to navigate to each location in a set of locations may be orders of magnitude greater than the number of locations in the set of locations. Reducing the complexity of the optimization reduces consumption of computational resources (e.g., memory and computing power) by the optimization engine 104.

In another example, as described above, the auxiliary task can include selecting one or more entities from a set of entities, where each entity is associated with a respective weight and value. The objective function can measure a total value of the selected entities, and the auxiliary task can be subject to a constraint that the total weight of the selected entities be less than a maximum allowable weight. In this example, each latent variable in the latent space can define a respective subset of the entities to be selected by the agent. For example, if the set of entities includes N entities, then each latent variable can be represented as an N-tuple of binary (0/1) values, where each entry i in the N-tuple has value 1 if the entity indexed by i is selected by the agent and has value 0 otherwise.

The optimization engine 104 can optimize an objective function that measures the total value of the selected entities (subject to the constraint on the total weight of the selected entities) by performing a numerical optimization over the latent space. The optimization engine 104 can optimize the objective function over the latent space using any appropriate numerical optimization technique, e.g., a dynamic programming technique. More generally, it will be appreciated that optimizing the objective function over the latent space in this instance is equivalent to solving a "knapsack problem," and the optimization engine 104 can implement any optimization technique applicable to solving the knapsack problem.

After performing the numerical optimization over the latent space to determine a latent variable that identifies a subset of the entities to be selected by the agent, the optimization engine 104 can map the latent variable to a corresponding sequence of atomistic actions. For example, if the entities are objects (e.g., packages) being collected by an agent (e.g., a robotic arm), then the optimization engine 104 can map the latent variable to a corresponding sequence of atomistic actions defining torques to be applied to the joints of the robotic arm to cause the robot arm to collect the objects specified by the latent variable. In this example, the latent space may have a significantly lower dimensionality than the set of possible sequences of atomistic actions, and thus performing the optimization over the latent space, i.e., rather than over the set of possible sequences of atomistic actions, can reduce the complexity of the optimization. In another example, if the entities are projects in a resource allocation environment, then the optimization engine 104 can map the latent variable to a corresponding sequence of atomistic actions that cause resources to be allocated to completing each of the projects specified by the latent variable.

In another example, as described above, the auxiliary task can include determining an assignment of each entity from a set of entities to a respective container in a set of containers, where each entity is associated with a respective weight and each container is associated with a respective capacity. The objective function can measure a number of containers that are assigned at least one entity, and the auxiliary task can be subject to a constraint that, for each container, a total weight of the entities assigned to the container be less than the capacity of the container. In this example, each latent variable in the latent space can define a respective assignment of each entity from the set of entities to a respective container from the set of containers. For example, if the number of entities is N and the number of containers is M, then each latent variable can be represented by a set of binary values $(x_{i,j}, i \in \{1, \ldots, N\}, j \in \{1, \ldots, M\})$, where $x_{i,j}$ has value 1 if entity i is assigned to container j and value 0 otherwise.

The optimization engine 104 can optimize an objective function that measures a number of containers that are assigned at least one entity by performing a numerical optimization over the latent space. The optimization engine 104 can optimize the objective function over the latent space using any appropriate numerical optimization technique, e.g., a refined-first-fit bin-packing optimization algorithm or a harmonic bin-packing optimization algorithm. More generally, it will be appreciated that optimizing the objective function over the latent space in this instance is equivalent to solving a "bin-packing problem," and the optimization engine 104 can implement any optimization technique applicable to solving the bin-packing problem.

After performing the numerical optimization over the latent space to determine a latent variable that identifies an assignment of each entity to a respective container, the optimization engine 104 can map the latent variable to a corresponding sequence of atomistic actions. In one example, the entities are objects (e.g., packages), the weight of each object defines a mass of the object, the containers are delivery vehicles, and the capacity of each delivery vehicle represents a weight capacity of the cargo bed of the delivery vehicle. In this example, the optimization engine 104 can map the latent variable to a corresponding sequence of atomistic actions defining controls to be applied to a robot to cause the robot to load each delivery vehicle with objects assigned to the delivery vehicle. The atomistic actions defining controls to be applied to the robot can include steering controls, acceleration controls, and controls for one or more actuators (e.g., gripping devices) of the robot. The latent space may have a significantly lower dimensionality than the set of possible sequences of atomistic actions, and thus performing the optimization over the latent space, i.e., rather than over the set of possible sequences of atomistic actions, can reduce the complexity of the optimization.

In some implementations, the optimization engine 104 performs a numerical optimization to determine a sequence of atomistic actions that optimizes (e.g., maximizes or minimizes) a target feature of the environment, optionally, subject to constraints on one or more constrained features of the environment. In these implementations, the objective function can be a "feature model," i.e., that can process a sequence of atomistic actions in accordance with values of a set of feature model parameters to generate a value of the target feature that would result from performing the atomistic actions. Optionally, the feature model can further generate a respective value for each of one or more constrained features, i.e., that would result from performing the sequence of atomistic actions. A few examples of possible feature models are described next.

In one example, the auxiliary task can include maximizing the output of a chemical process in an industrial facility, and the feature model can be a chemical process simulation model. For example, the chemical process simulation model can be configured to process a sequence of atomistic actions (e.g., to modify the parameters of the chemical process) to generate a value defining the output of the chemical process that would result from performing the sequence of atomistic actions. The parameters of the chemical process can include, e.g., heat, pressure, chemical concentrations, etc.

In another example, the auxiliary task can include maximizing airflow through a ventilation shaft in a data center, and the feature model can be a physics engine. For example, the physics engine can be configured to process a sequence of one or more actions, e.g., defining the orientations and fan speeds of a set of fans, to generate a value defining the airflow in the ventilation shaft.

In some cases, the parameters of the feature model may have predefined values based on scientific principles, e.g., the parameters of a chemical process simulation model may be determined based on principles of mass transfer, etc.

In other cases, the action selection system 100 may learn the parameter values of the feature model, e.g., using supervised learning techniques, based on previous interactions of the agent with the environment. More specifically, as the agent 116 interacts with the environment 118, the action selection system 100 can store training examples that each define: (i) a sequence of atomistic actions performed by the agent 116, and (ii) the resulting value of the target feature. The action selection system 100 can then train the parameters of the feature model on the training examples, e.g., by training the feature model to process the sequence of atomistic actions from a training example to generate an output that matches the target feature value specified by the training example. The action selection system 100 can train the parameter values of the feature model using any appropriate machine learning training technique, e.g., stochastic gradient descent. In some instances, the action selection system 100 can require that the feature model be trained on at least a minimum threshold amount of training data before making the optimization action based on the feature model available for selection by the agent.

The optimization engine 104 can optimize the feature model over a set of sequences of atomistic actions using any appropriate optimization technique. For example, if the feature model is a differentiable model, e.g., a neural network model, then the optimization engine 104 can iteratively optimize the feature model over the set of sequences of atomistic actions using a gradient descent optimization technique. More specifically, prior to a first optimization iteration, the optimization engine 104 can initialize (e.g., randomly) a sequence of atomistic actions. Then, at each optimization iteration in a sequence of optimization iterations, the optimization engine 104 can process the current sequence of atomistic actions using the feature model to generate a target feature value. The optimization engine 104 can determine gradients of the target feature value with respect to the current sequence of atomistic actions, e.g., using backpropagation, and then update the current sequence of atomistic actions using the gradients, e.g., using an appropriate gradient descent update rule.

In some implementations, the optimization engine 104 performs a numerical optimization to determine a sequence of atomistic actions that cause the state of the environment to remain within a set of allowable states, as described above. In these implementations, the optimization engine 104 can perform the numerical optimization with reference to a "dynamics model" $f(\cdot)$ that defines the dynamics of the environment, e.g., the dynamics model can have the form:

$$x'(t)=f(x(t),u(t),t) \quad (1)$$

where t denotes a time step, x(t) denotes the state of the environment at time t, u(t) denotes the action performed at time t, and x'(t) denotes the first derivative of the state of the environment at time t. In particular, the optimization engine 104 can optimize an objective function, e.g., that measures deviation of the state of the environment from the set of allowable states, subject to a constraint that the trajectory of states of the environment satisfy the dynamics model, using optimal control optimization techniques. Examples of optimal control optimization techniques are described with reference to Frank L. Lewis, Draguna Vrabie, and Vassilis L. Syrmos, "Optimal Control," $3^{rd}$ Edition, Wiley, Hoboken, N.J., 2012. The dynamics model can be any appropriate model that captures the dynamics of the environment; for example, if the environment is a (real or simulated) physical environment, then the dynamics model can be derived from a physics engine, i.e., that models the physics of the environment.

The action selection system 100 uses the action selection neural network 124, the selection engine 110, and the optimization engine 104 to select a respective action to be performed by the agent 116 at each time step.

In particular, at any time step where the selection engine 110 selects an atomistic action 106, i.e., from the set of possible actions, the action selection system 100 can cause the agent to perform the selected atomistic action 106.

At any time step where the selection engine 110 selects an optimization action 108, the action selection system 100 determines a sequence of one or more atomistic actions 114 to optimize the objective function associated with the optimization action 108. The action selection system 100 then identifies the sequence of one or more atomistic actions 102 as actions to be performed by the agent at one or more time steps starting from the current time step. For example, the agent 116 can execute a sequence of N atomistic actions over a sequence of N time steps, i.e., starting from the current time step.

In response to generating a sequence of N atomistic actions to be performed over a sequence of N time steps, the action selection system 100 can optionally refrain from processing observations 122 to generate action selection outputs 112 over the next N time steps. Rather, at each time step in the next N time steps, the agent 116 can perform the corresponding atomistic action from the sequence of atomistic actions 114 at the time step, i.e., without reference to the observation 122 at the time step.

In some instances, particularly for lengthy sequences of atomistic actions 114 in rapidly evolving environments 118, the sequence of atomistic actions 114 may become "stale" before the agent completes performing each action in the sequence of atomistic actions 114. That is, as the environment dynamically evolves, the actions in the sequence of atomistic actions 114 may become progressively less effective for advancing the agent toward the objective of accomplishing the auxiliary task, and more generally, the main task.

To address this issue, the action selection system 100 can process the observation 122 at each time step to generate an action selection output 112 for the time step, including for time steps that have already been assigned an atomistic action from a sequence of atomistic actions 114. The action selection output 112 includes a respective score for each action in the set of possible actions, and the set of possible actions can include a "termination" action, i.e., in addition to the atomistic actions and the optimization actions.

The selection engine 110 can, at each time step, select an action from the set of possible actions based on the action selection output 112 generated at the time step. If the selection engine 110 selects the termination action at a time step that has already been assigned an atomistic action from a sequence of atomistic actions 114, then the action selection engine 110 can "terminate" the sequence of atomistic actions 114. That is, the action selection system 100 can determine that the agent 116 should cease executing the sequence of atomistic actions 114 as of the next time step. In particular, at the next time step, the action selection system 100 determines the atomistic action to be performed by the agent at the next time step by selecting an action from the set of possible actions using the action selection output 112 for the next time step. If the selection engine 110 selects the termination action at a time step that has not already been assigned an atomistic action from a sequence of atomistic actions 114, then the selection engine 110 can disregard the termination action. For example, the selection engine 110 can disregard the termination action by resampling a different action (i.e., other than the termination action) from the set of possible actions.

In some implementations, the action selection system 100 augments the observation 122 processed by the action selection neural network 124 at each time step to include data indicating whether the time step has been assigned an atomistic action from a sequence of atomistic actions 102. For instance, the action selection system 100 can augment the observation 122 at each time step with a "flag," e.g., in the form of a binary 0/1 variable, indicating whether the time step has been assigned an atomistic action from a sequence of atomistic actions 102. That is, at each time step, the flag appended to the observation 122 defines whether the agent 116 is currently executing a sequence of atomistic actions 102 generated by the optimization engine 104. Augmenting the observation 122 at each time step in this manner can enable the action selection neural network 124 to more rapidly learn when terminating a sequence of atomistic actions 102, e.g., by selecting the termination action, would improve the performance of the agent on the main task.

After terminating a sequence of atomistic actions 102 generated by the optimization engine 104, the action selection system 100 can determine the action 114 to be performed by the agent at the next time step by selecting an action from the set of possible actions using the action selection output 112 for the next time step. For instance, the action selection system 100 may once again select an optimization action 108, and perform an optimization using the optimization engine 104 to determine a new sequence of atomistic actions 102 based on the current state of the environment. Alternatively, rather than selecting an optimization action 108, the action selection system 100 may select an atomistic action 106, e.g., by sampling an atomistic action 106 from the set of possible actions in accordance with a probability distribution defined by the action selection output 112 at the next time step.

The training engine 126 is configured to train the action selection neural network 124, based on the rewards 120 received by the action selection system 100, using reinforcement learning techniques. More specifically, the training engine 126 trains the action selection neural network 124 to optimize a reinforcement learning objective function that encourages an increase in a cumulative measure of rewards received by the action selection system 100 as a result of actions 114 performed by the agent 116. The cumulative measure of rewards received by the action selection system 100 can be, e.g., a long term time-discounted sum of rewards. The reinforcement learning technique can be, e.g., a policy optimization technique, a Q-learning technique, or any other appropriate reinforcement learning technique.

The reward received at each time step characterizes a performance of the agent 116 on the main task being performed by the agent. Thus training the action selection neural network using reinforcement learning techniques to increase a cumulative measure of rewards received by the agent causes the action selection neural network to select actions that result in the agent 116 performing the main task more effectively. In particular, the training causes the action selection neural network to learn when selecting an optimization action would be beneficial to the performance of the agent 116 on the main task.

Generally, each auxiliary task is related to the main task, e.g., such that performing the auxiliary task advances the agent toward the objective of accomplishing the main task. By enabling the action selection neural network to select an optimization action corresponding to an auxiliary task, and thereafter determining a sequence of atomistic actions that define an effective solution to the auxiliary task, the action selection system 100 can accelerate the training of the action selection neural network. In particular, the action selection system 100 relieves the action selection neural network from the burden of implicitly encoding solutions to the auxiliary tasks in the parameter values of the action selection neural network. Rather, the action selection neural network can rely on the optimization engine to determine an effective solution to an auxiliary task through direct numerical optimization of an objective function that measures performance of the agent on the auxiliary task.

In particular, in many cases, the main task is associated with auxiliary tasks that can be efficiently "solved" using numerical optimization techniques that do not require reinforcement learning. However, training the action selection neural network to implicitly solve the auxiliary tasks by reinforcement learning can be difficult. For example, the action selection neural network is not equipped with prior knowledge of the existence of the auxiliary tasks, and therefore must explore the environment and the action space in order to implicitly identify auxiliary tasks before encoding solutions the auxiliary tasks in the action selection neural network parameters. Moreover, the action selection neural network is trained using main task rewards that are only tangentially associated with the performance of the agent on the auxiliary tasks, which increases the difficulty of training the action selection neural network to perform the auxiliary tasks by reinforcement learning.

Therefore, making optimization actions available to the action selection neural network can dramatically reduce the number of training iterations required to achieve an acceptable performance on the main task, and in some cases, can enable the action selection neural network to perform tasks that could not otherwise be solved. More specifically, during training, the action selection neural network is only required to learn when selecting an optimization action would be beneficial to performing the main task, i.e., rather than learning how to perform the auxiliary task corresponding to the optimization action by reinforcement learning. If certain auxiliary tasks are not relevant to the main task, the action selection neural network can learn to refrain from selecting optimization actions corresponding to those auxiliary tasks.

Figure 2:
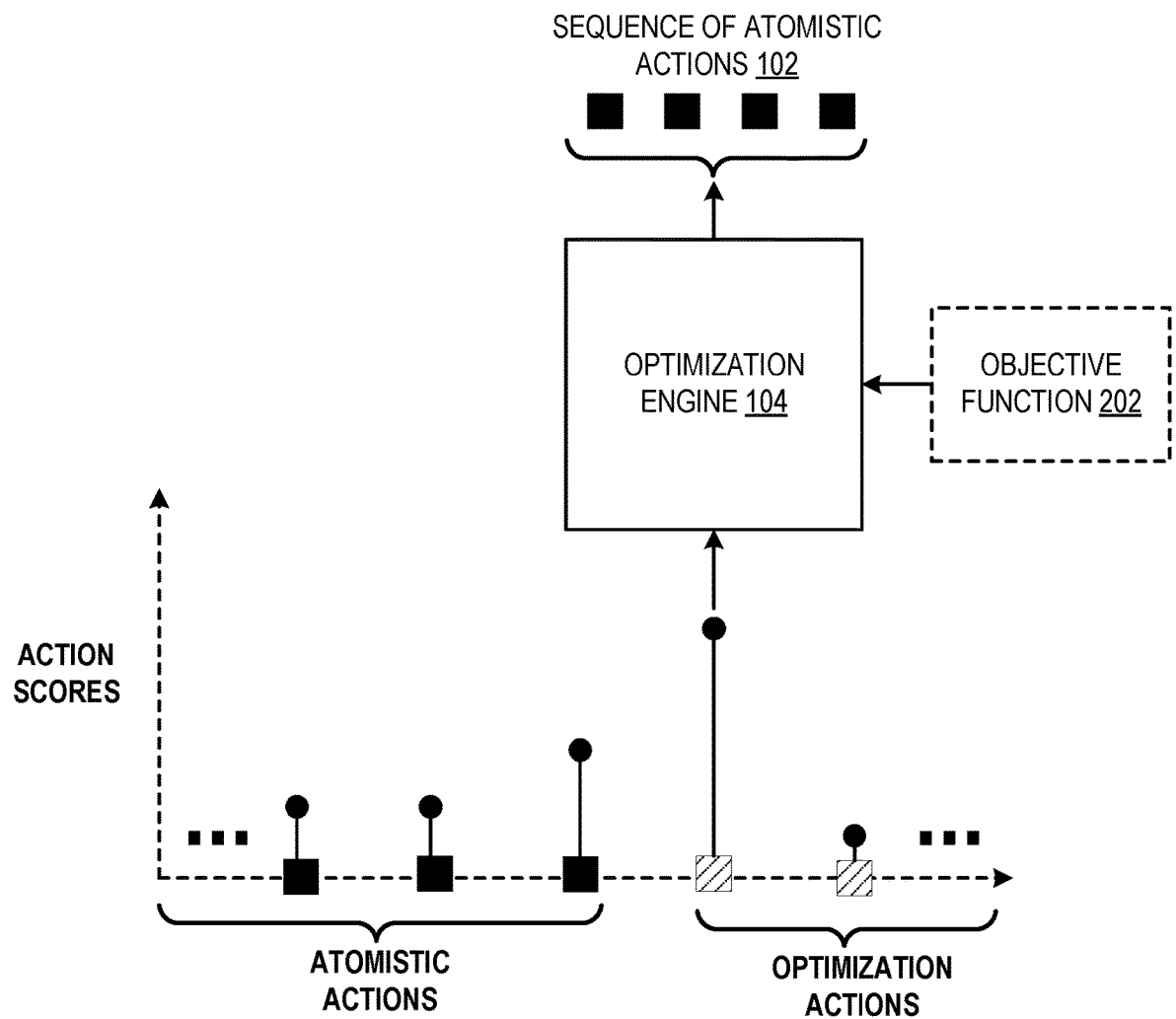
FIG. 2 illustrates an action selection output generated by an action selection neural network.

FIG. 2 illustrates an action selection output generated by the action selection neural network described with reference to FIG. 1. The action selection output includes a respective action score for each action in a set of possible actions, where the set of possible actions includes: (i) a set of atomistic actions, and (ii) a set of optimization actions. The action selection system selects an action from the set of possible actions using the action selection output, e.g., by sampling in accordance with a probability distribution, defined by the action scores, over the set of possible actions. In response to selecting an optimization action, the action selection system 100 can provide data identifying the optimization action to the optimization engine 104. The optimization engine 104 can perform a numerical optimization to identify a sequence of atomistic actions that is predicted to optimize an objective function 202 measuring performance of the agent on a corresponding auxiliary task.

Figure 3:
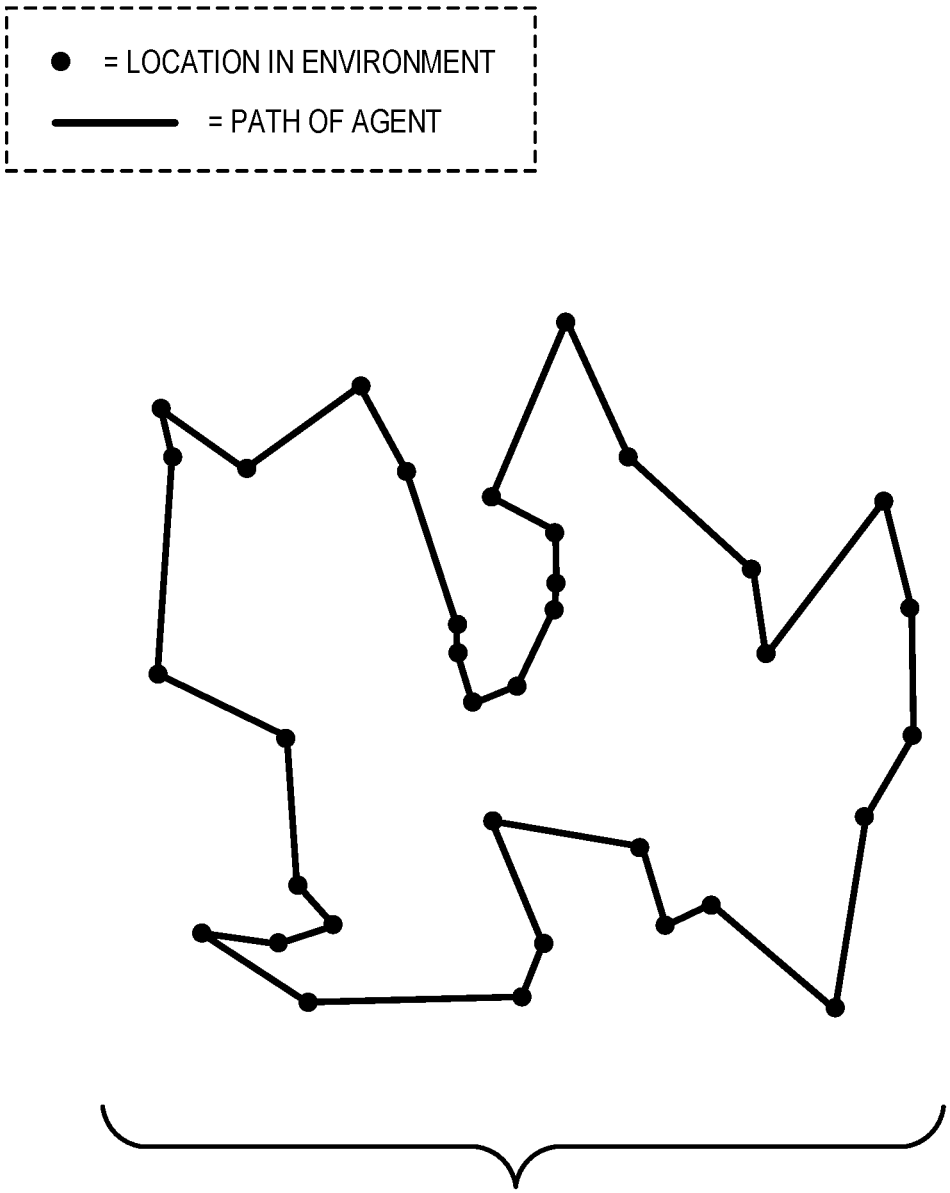
FIG. 3 illustrates an example of a result of a numerical optimization, performed by the action selection system, to minimize a distance traveled by the agent while performing an auxiliary task of visiting each location in a set of locations in the environment.

FIG. 3 illustrates an example of a result of a numerical optimization, performed by the action selection system, to minimize a distance traveled by the agent while performing an auxiliary task of visiting each location in a set of locations in the environment. The action selection system can perform the numerical optimization, e.g., using a dynamic programming technique that provides a solution to the traveling salesman problem.

Figure 4:
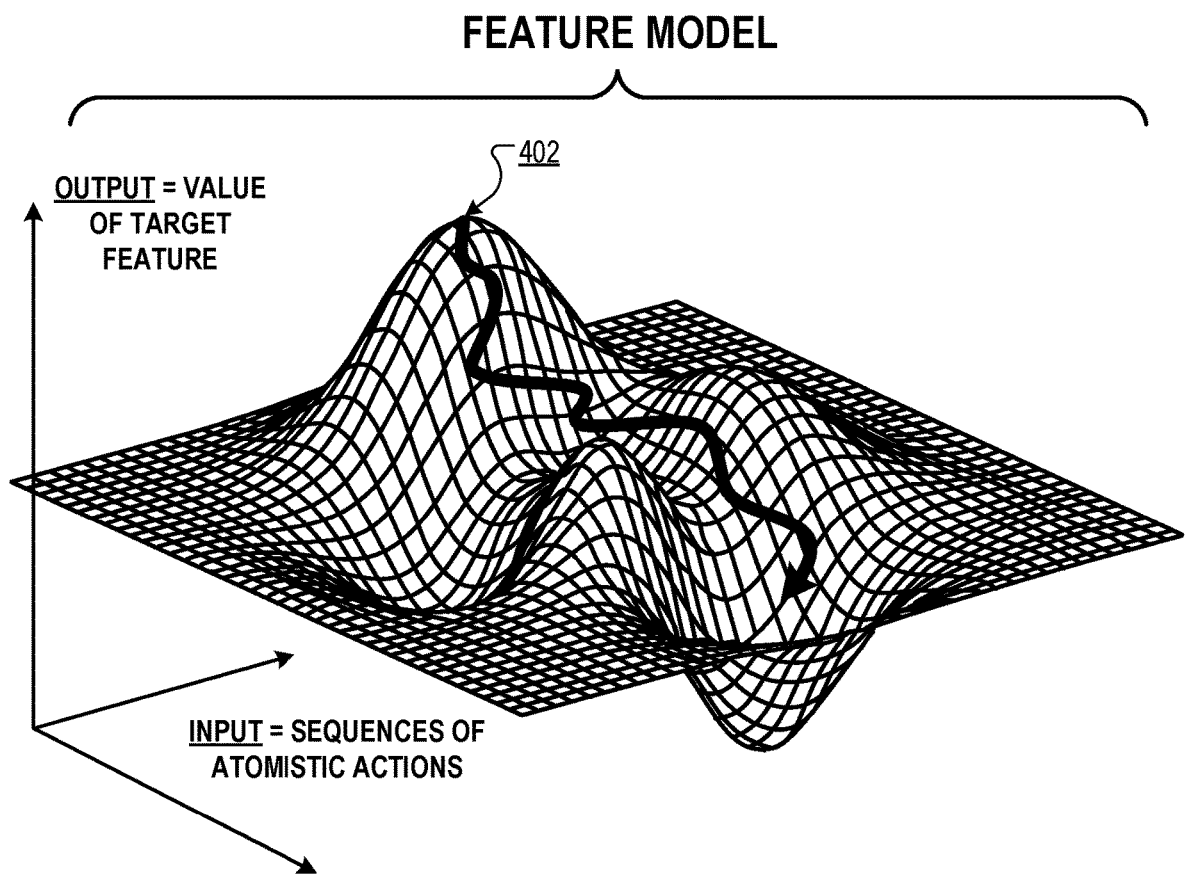
FIG. 4 illustrates an example of a feature model that processes a sequence of atomistic actions to generate an output that defines the value of a target feature of the environment, i.e., that is predicted to result from the agent performing the sequence of atomistic actions.

FIG. 4 illustrates an example of a feature model, i.e., that processes a sequence of atomistic actions to generate an output that defines the value of a target feature of the environment, i.e., that is predicted to result from the agent performing the sequence of atomistic actions. Examples of feature models might include chemical process simulation models or/physics models (engine). The action selection system can perform a numerical optimization, e.g., a gradient descent optimization, to identify a sequence of atomistic actions that are predicted to optimize the resulting value of the target feature. The line 402 illustrates the progress of an iterative gradient descent optimization to determine a sequence of atomistic actions to minimize the target feature value.

Figure 5:
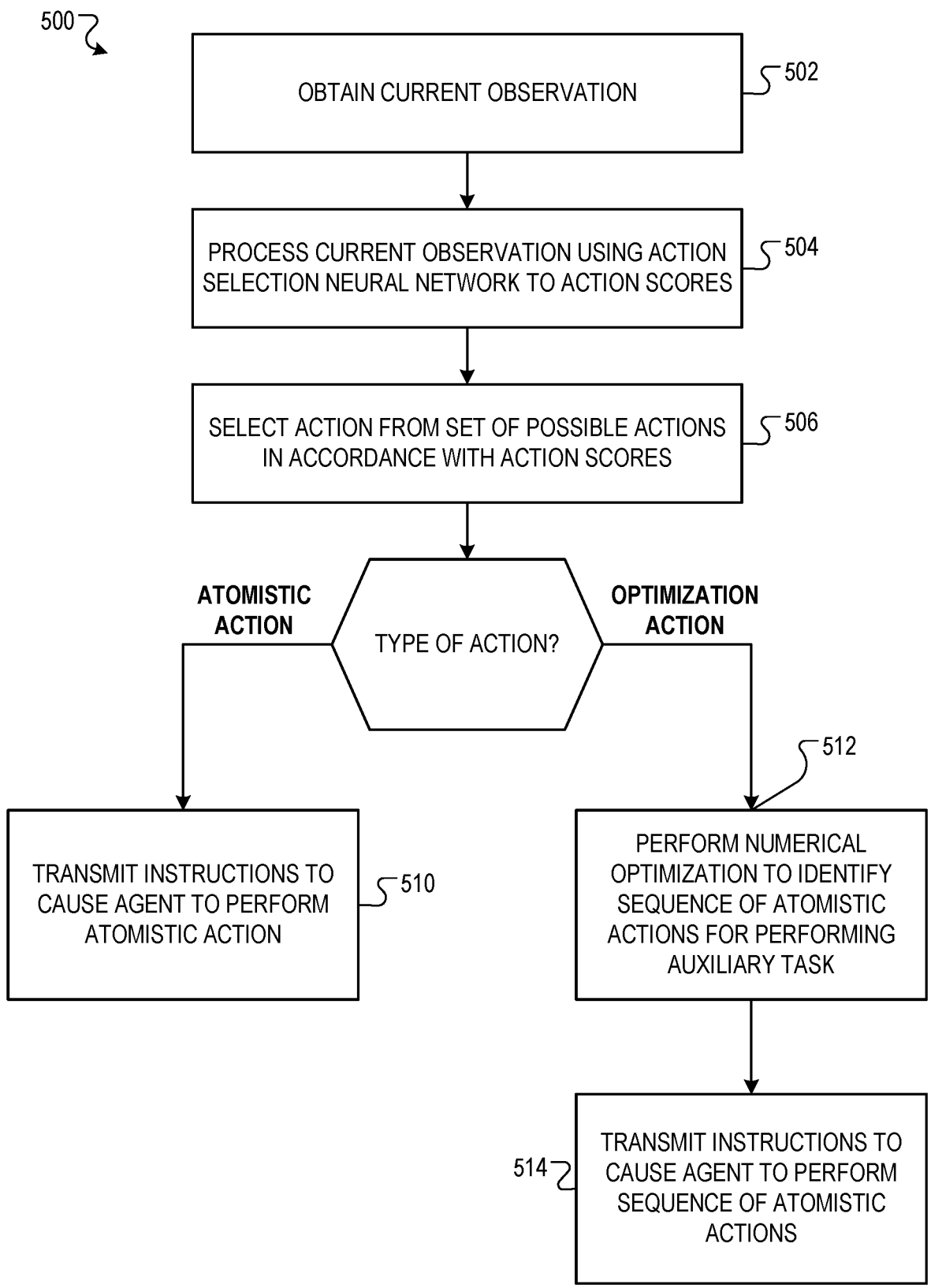
FIG. 5 is a flow diagram of an example process for selecting an action to be performed by an agent at a time step.

FIG. 5 is a flow diagram of an example process 500 for selecting an action to be performed by an agent at a time step. For convenience, the process 500 will be described as being performed by a system of one or more computers located in one or more locations. For example, an action selection system, e.g., the action selection system 100 of FIG. 1, appropriately programmed in accordance with this specification, can perform the process 500.

The system obtains a current observation characterizing a current state of the environment at the time step (502). The current observation can be generated, e.g., by one or more sensors of the agent.

The system processes the current observation using an action selection neural network to generate an action selection output (504). The action selection output includes a respective action score for each action in a set of possible actions. The set of possible actions includes: (i) a set of atomistic actions, and (ii) one or more optimization actions. Each atomistic action defines a respective action that can be performed by the agent to interact with the environment. Each optimization action is associated with a respective objective function that measures performance of the agent on a corresponding auxiliary task.

If the selected action is an atomistic action, then the system transmits instructions to cause the agent to perform the atomistic action at the time step (510).

If the selected action is an optimization action, then the system performs a numerical optimization to identify a sequence of one or more atomistic actions that are predicted to optimize the objective function that measures performance of the agent on the corresponding auxiliary task (512). The system then selects the sequence of atomistic actions as actions to be performed by the agent at a sequence of one or more time steps starting from the current time step (514).

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers for selecting actions to be performed by an agent interacting with an environment to cause the agent to accomplish a main task, the method comprising:
    selecting an action to be performed by the agent at each time step in a sequence of time steps, comprising, at each of one or more time steps:
        obtaining a current observation characterizing a current state of the environment;
        processing the current observation using an action selection neural network to generate an action selection output that comprises a respective action score for each action in a set of possible actions,
            wherein the set of possible actions comprises: (i) a plurality of atomistic actions, wherein each atomistic action defines a respective action that can be performed by the agent to interact with the environment, and (ii) one or more optimization actions, wherein each optimization action corresponds to a respective auxiliary task which is different than the main task;
        selecting an action from the set of possible actions in accordance with the action scores, wherein the selected action is an optimization action;
        in response to selecting the optimization action:
            identifying an objective function that measures performance of the agent on the auxiliary task corresponding to the optimization action;
            performing a numerical optimization to identify a sequence of multiple atomistic actions, from the set of possible actions, that are predicted to optimize the objective function;
            mapping the optimization action onto the sequence of multiple atomistic actions that are predicted to optimize the objective function; and
            selecting the sequence of atomistic actions mapped onto by the optimization action as actions to be performed by the agent to interact with the environment at a sequence of multiple time steps starting from the current time step; and
        controlling the agent to cause the agent to perform the selected sequence of atomistic actions;
    receiving, at each time step in the sequence of time steps, a main task reward that characterizes performance of the agent on the main task; and
    training the action selection neural network based on the main task rewards using reinforcement learning techniques.

2. The method of claim 1, wherein performing the numerical optimization comprises:
    performing the numerical optimization over a space of latent variables to identify an optimal latent variable that is predicted to optimize the objective function, wherein each latent variable in the space of latent variables defines a plan for the agent to perform the auxiliary task; and
    mapping the optimal latent variable onto a sequence of one or more atomistic actions that, if performed by the agent, would cause the agent to execute the plan defined by the optimal latent variable.

3. The method of claim 2, wherein the auxiliary task comprises navigating to each location in a set of locations in the environment, and wherein each latent variable in the space of latent variables defines a respective order in which the agent should navigate to locations in the set of locations.

4. The method of claim 3, wherein the objective function measures a distance traveled by the agent to navigate to each location in the set of locations.

5. The method of claim 2, wherein performing the numerical optimization over the space of latent variables comprises:
    performing the numerical optimization over the space of latent variables using a dynamic programming optimization technique.

6. The method of claim 1, wherein the auxiliary task comprises optimizing a target feature of the environment.

7. The method of claim 6, wherein the objective function is defined by a feature model that is configured to process an input sequence of atomistic actions to generate an output that defines a value of the target feature that is predicted to result from the agent performing the input sequence of atomistic actions.

8. The method of claim 7, wherein performing the numerical optimization comprises:
    performing the numerical optimization over a set of possible sequences of atomistic actions to identify an optimal sequence of atomistic actions that is predicted to optimize the feature model.

9. The method of claim 8, wherein performing the numerical optimization over the set of possible sequences of atomistic actions comprises:
    initializing a current sequence of atomistic actions; and
    iteratively updating the current sequence of atomistic actions, comprising, at each optimization iteration in a sequence of optimization iterations:
        processing the current sequence of atomistic actions using the feature model to generate a target feature value;
        determining gradients of the target feature value with respect to the current sequence of atomistic actions; and
        updating the current sequence of atomistic actions using the gradients.

10. The method of claim 7, wherein the environment comprises an industrial facility, the target feature of the environment defines an output of a chemical process in the industrial facility, and the feature model comprises a chemical process simulation model.

11. The method of claim 7, wherein the feature model comprises a neural network model.

12. The method of claim 1, wherein the auxiliary task comprises maintaining a state of the environment within a set of allowable states.

13. The method of claim 12, wherein the set of allowable states comprise states where the agent is within a threshold distance of a desired trajectory through the environment.

14. The method of claim 12, wherein the objective function measures deviation of a state of the environment from the set of allowable states, and wherein performing the numerical optimization comprises:
  obtaining a dynamics model that models dynamics of the environment; and
  performing the numerical optimization to identify a sequence of atomistic actions that are predicted to optimize the objective function, using optimal control optimization techniques, subject to a constraint that the sequence of atomistic actions satisfies the dynamics model that models the dynamics of the environment.

15. The method of claim 1, wherein at each of one or more time steps in the sequence of time steps, selecting the action to be performed by the agent at the time step comprises:
  selecting an atomistic action from the set of possible actions; and
  in response to selecting the atomistic action, causing the agent to perform the atomistic action at the time step.

16. The method of claim 1, wherein the environment is a simulated environment.

17. The method of claim 1, wherein the agent is a mechanical agent.

18. A system comprising:
  one or more computers; and
  one or more storage devices communicatively coupled to the one or more computers, wherein the one or more storage devices store instructions that, when executed by the one or more computers, cause the one or more computers to perform operations for selecting actions to be performed by an agent interacting with an environment to cause the agent to accomplish a main task, the operations comprising:
  selecting an action to be performed by the agent at each time step in a sequence of time steps, comprising, at each of one or more time steps:
    obtaining a current observation characterizing a current state of the environment;
    processing the current observation using an action selection neural network to generate an action selection output that comprises a respective action score for each action in a set of possible actions,
      wherein the set of possible actions comprises: (i) a plurality of atomistic actions, wherein each atomistic action defines a respective action that can be performed by the agent to interact with the environment, and (ii) one or more optimization actions, wherein each optimization action corresponds to a respective auxiliary task which is different than the main task;
    selecting an action from the set of possible actions in accordance with the action scores, wherein the selected action is an optimization action;
    in response to selecting the optimization action:
      identifying an objective function that measures performance of the agent on the auxiliary task corresponding to the optimization action;
      performing a numerical optimization to identify a sequence of multiple one or more atomistic actions, from the set of possible actions, that are predicted to optimize the objective function;
      mapping the optimization action onto the sequence of multiple atomistic actions that are predicted to optimize the objective function; and
      selecting the sequence of atomistic actions mapped onto by the optimization action as actions to be performed by the agent to interact with the environment at a sequence of multiple time steps starting from the current time step; and
      controlling the agent to cause the agent to perform the selected sequence of atomistic actions;
  receiving, at each time step in the sequence of time steps, a main task reward that characterizes performance of the agent on the main task; and
  training the action selection neural network based on the main task rewards using reinforcement learning techniques.

19. One or more non-transitory computer storage media storing instructions that when executed by one or more computers cause the one or more computers to perform operations for selecting actions to be performed by an agent interacting with an environment to cause the agent to accomplish a main task, the operations comprising:
  selecting an action to be performed by the agent at each time step in a sequence of time steps, comprising, at each of one or more time steps:
    obtaining a current observation characterizing a current state of the environment;
    processing the current observation using an action selection neural network to generate an action selection output that comprises a respective action score for each action in a set of possible actions,
      wherein the set of possible actions comprises: (i) a plurality of atomistic actions, wherein each atomistic action defines a respective action that can be performed by the agent to interact with the environment, and (ii) one or more optimization actions, wherein each optimization action corresponds to a respective auxiliary task which is different than the main task;
    selecting an action from the set of possible actions in accordance with the action scores, wherein the selected action is an optimization action;
    in response to selecting the optimization action:
      identifying an objective function that measures performance of the agent on the auxiliary task corresponding to the optimization action;
      performing a numerical optimization to identify a sequence of multiple atomistic actions, from the set of possible actions, that are predicted to optimize the objective function;
      mapping the optimization action onto the sequence of multiple atomistic actions that are predicted to optimize the objective function; and
      selecting the sequence of atomistic actions mapped onto by the optimization action as actions to be performed by the agent to interact with the environment at a sequence of multiple one or more time steps starting from the current time step; and
      controlling the agent to cause the agent to perform the selected sequence of atomistic actions;

receiving, at each time step in the sequence of time steps, a main task reward that characterizes performance of the agent on the main task; and training the action selection neural network based on the main task rewards using reinforcement learning techniques.

* * * * *